United States Patent
Calakli et al.

(10) Patent No.: US 9,661,304 B2
(45) Date of Patent: May 23, 2017

(54) PRE-CALCULATION OF SINE WAVES FOR PIXEL VALUES

(71) Applicant: Ricoh Company, Ltd., Tokyo (JP)

(72) Inventors: Fatih Calakli, Menlo Park, CA (US); John Barrus, Menlo Park, CA (US)

(73) Assignee: RICOH COMPANY, LTD., Tokyo (JP)

(*) Notice: Subject to any disclaimer, the term of this patent is extended or adjusted under 35 U.S.C. 154(b) by 634 days.

(21) Appl. No.: 13/665,880

(22) Filed: Oct. 31, 2012

(65) Prior Publication Data

US 2014/0118496 A1    May 1, 2014

(51) Int. Cl.
*H04N 13/02* (2006.01)

(52) U.S. Cl.
CPC .............................. *H04N 13/0253* (2013.01)

(58) Field of Classification Search
CPC ........... G06F 17/30011; G06F 21/6218; G09G 3/344; G09G 2320/0252; G09G 2340/16; H04N 2201/3277
See application file for complete search history.

(56) References Cited

U.S. PATENT DOCUMENTS

| | | | | |
|---|---|---|---|---|
| 5,561,526 A * | 10/1996 | Huber et al. | | 356/604 |
| 6,373,963 B1 * | 4/2002 | Demers et al. | | 382/108 |
| 7,149,337 B2 * | 12/2006 | Michaelis | | G06T 7/0057 356/601 |
| 2004/0246496 A1 * | 12/2004 | Yoshida | | 356/605 |
| 2007/0115484 A1 * | 5/2007 | Huang et al. | | 356/604 |
| 2007/0206204 A1 * | 9/2007 | Jia et al. | | 356/604 |
| 2009/0096783 A1 * | 4/2009 | Shpunt et al. | | 345/419 |
| 2010/0046801 A1 * | 2/2010 | Ishiyama | | 382/106 |
| 2010/0177319 A1 * | 7/2010 | Towers et al. | | 356/511 |
| 2012/0281087 A1 * | 11/2012 | Kruse | | 348/136 |
| 2013/0271574 A1 * | 10/2013 | Dorrance et al. | | 348/46 |
| 2013/0343634 A1 * | 12/2013 | Xu et al. | | 382/154 |
| 2015/0176982 A1 * | 6/2015 | Gupta et al. | | 348/136 |

OTHER PUBLICATIONS

Barrus et al., "QOTA: A Fast, Multi-Purpose Algorithm for Terrain Following in Virtual Environments", MERL, Sep. 1996, 9 pgs.

(Continued)

*Primary Examiner* — Neil Mikeska
(74) *Attorney, Agent, or Firm* — Patent Law Works LLP

(57) ABSTRACT

A system and method for determining positions in three-dimensional space are described. The system includes a controller, a phase image module, a presentation module and a phase determination module. The controller receives projector geometry parameters. A phase image module determines a plurality of sinusoidal images where a constant phase represents a flat plane in a three-dimensional space based on the projector geometry parameters. A presentation module projects the plurality of sinusoidal images to be captured by a camera. The phase determination module determines a phase value at a camera pixel. The phase determination module determines an intersection between the flat plane of the phase value and the camera pixel to identify a ray-plane intersection.

18 Claims, 9 Drawing Sheets

(56) References Cited

OTHER PUBLICATIONS

Brown et al., "Camera-Based Calibration Techniques for Seamless Multi-Projector Displays", IEEE Transactions on Visualization and Computer Graphics, vol. X, No. X, 2005, 16 pgs.

de Villiers et al., "Centi-Pixel Accurate Real-Time Inverse Distortion Correction", Optomechatronic Technologies, 2008, 8 pgs.

Drareni et al., "Methods for Geometrical Video Projector Calibration", Jan. 2012, 16 pgs.

Falcao et al., "Plane-Based Calibration of a Projector-Camera System", VIBOT Master, 2008, 12 pgs.

Garcia et al., "Three-Dimensional Mapping and Range Measurement by Means of Projected Speckle Patterns", Optical Society of America, vol. 47, No. 16, Jun. 2008, 9 pgs.

Gong et al., "Ultrafast 3-D Shape Measurement With an Off-the-Shelf DLP Projector", Department of Mechanical Engineering, Iowa State University, Optics Express, vol. 18, No. 19, 2010, 12 pgs.

Juang et al., "Photometric Self-Calibration of a Projector-Camera System", 2007, 8 pgs.

Dr. Lau's Research Blog, "Real-Time Structured Light Illumination", Apr. 2, 2010, 1 pg.

Liu, "Real-time 3-D Reconstruction by Means of Structured Light Illumination", University of Kentucky Doctoral Dissertations, dated 2010, 195 pages.

O'Rourke, Computational Geometry in C, Second Edition, Chapter 7, Cambridge University, 1998, pp. 220-293.

Ouellet et al., "Geometric Calibration of a Structured Light System Using Circular Control Points", Proceedings of 3DPVT'08—The Fourth International Symposium on 3D Data Processing, Visualization and Transmission, Georgia Institute of Technology, Atlanta, GA, USA, Jun. 18-20, 2008, 8 pgs.

Rajeev, "Scalable Self-Calibrating Display Technology for Seamless Large-Scale Displays", Massachusetts Institute of Technology, dated Jan. 24, 1999, 67 pages.

Rashkar, "A Low-Cost Projector Mosaic with Fast Registration", Mitsubishi Electric Research Laboratories, The 5th Asian Conference on Computer Vision, dated Jan. 23-25, 2002, 9 pages, Melbourne, Australia.

Ulusoy et al., "One-Shot Scanning Using De Bruijn Spaced Grids", IEEE 12th International Conference on Computer Vision Workshops, ICCV Workshops, dated 2009, pp. 1786-1792.

Vaquero et al., "A Projector-Camera Setup for Geometry-Invariant Frequency Demultiplexing", IEEE 2009, dated Jun. 20-25, 2009, 9 pgs.

Zhang, "A Flexible New Technique for Camera Calibration", Microsoft Research, Microsoft Corporation, dated Dec. 2, 1998, 22 pgs.

Zhang, "Superfast Phase-Shifting Method for 3-D Shape Measurement", Optical Society of America, dated Apr. 22, 2010, 6 pages.

\* cited by examiner

PRE-CALCULATION OF SINE WAVES FOR PIXEL VALUES

BACKGROUND OF THE INVENTION

Field of the Invention

The specification relates to a system for determining positions in three-dimensional space. In particular, the specification relates to a system, including a projector and camera, for determining positions in three-dimensional space by pre-calculating sine waves for pixel values.

Description of the Problem

Using a projector and a camera, it is possible to calculate the position of an object in space if the object can be seen by the camera and an image can be projected on the object by the projector. The accurate position calculation requires that the position of both the camera and projector are known and the internal geometry of the camera and projector must also be known.

For the camera in a given location and orientation, each pixel of the image sensor "sees" objects and light along a single direction that can be represented by a ray emanating from the camera. Pixels that are close to each other have rays leaving the camera in a similar direction.

A projector in a given location and orientation can shine a small square of light from each pixel. Each pixel of the projector can be represented by a single ray emanating from the projector in a specific direction.

If the geometry of the rays from the projector and camera are known and the location of the two devices are known, it is possible to use the geometric information to calculate the position where a small square of light from the projector lands on an object. The camera can capture the square of light and calculate the position of the lit part of the object. The geometric intersection of the ray of light and the ray of the pixel that captures that light is a point in three-dimensional space and the three-dimensional location of that part of the object.

The intersection of two such rays is simple to calculate and is given in many texts, including in Chapter 7 of a book by O'Rourke called "Computational Geometry in C" published in 1998 by Cambridge University Press.

Finding the location of the object using one projector pixel at a time is very slow. Alternatively an image or series of images can be projected onto the object, an image of the object captured by the camera and the image can be analyzed to determine the three-dimensional shape and position of the object. A paper by Calakli et al. entitled "One-Shot Scanning using De Bruijn Spaced Grids" includes a detailed explanation of one method of acquiring a three-dimensional shape using a special image of a De Bruin-spaced grid. The image projected can be a single image or a sequence of images. The image sequence can contain a checkerboard, a spatial pattern or a series of sinusoid patterns. The location of the projector pixel displayed by the projector is calculated by finding a pattern in the camera image or by observing a sequence of changes in the camera pixels. In the spatial pattern method, the projector projects an image containing many small unique patterns, the camera captures the image, the locations of the patterns are detected in the image and a ray-ray intersection calculation is used to recover the three-dimensional location of the object as seen by the camera.

In the spatial speckle pattern method, the projector projects a speckle pattern where the patterns of speckles each serve as a reference point from which changes in the phase of the light scattered from a rough surface can be tracked. Changes in the intensity of the speckle pattern are analyzed to determine displacements and rotations by comparing a shift between two intensity speckle patterns captured at two different times.

In the sinusoidal method which is typically called "Phase Shifting Profilometry", the projector projects a series of images containing sinusoidal pattern on the object and the camera captures the image. Using special techniques well known to those with ordinary skill in the art, the camera can identify the angle or phase of the sinusoidal image seen by each pixel of the camera. If the sinusoidal images vary horizontally but are constant in the vertical direction, the identified angle tells the system which column of projector pixels the camera pixel is observing. In this case, the column of pixels represents a surface instead of a single ray emanating from the projector. The system can calculate the intersection of the surface represented by the column of projector pixels and the ray represented by the single camera pixel. The intersection point represents the three-dimensional point in space where the object was illuminated by the projector and captured by the camera.

In most projectors, a projected column or row of pixels does not represent a plane. However, a projected column or row of pixels represents an approximation of a plane. For example, projectors that have radial distortion due to lens design project a row of pixels that appear curved instead of flat. Because projector and camera lenses have radial distortion, errors are introduced into captured data. Some systems ignore the radial distortion when determining the intersection, which produces inaccurate results. Other systems try to correct the distortion through interpolation (also known as image warping), however, these calculations are still inaccurate, which limits the speed and accuracy of the three-dimensional calculations.

SUMMARY OF THE INVENTION

The specification overcomes the deficiencies and limitations of the prior art at least in part by providing a system and method for determining positions in three-dimensional space. In one embodiment, the system includes a controller, a phase image module, a presentation module and a phase determination module.

The controller receives projector geometry parameters. A phase image module determines a plurality of sinusoidal images where a constant phase represents a flat plane in a three-dimensional space based on the projector geometry parameters. A presentation module projects the plurality of sinusoidal images to be captured by a camera. The phase determination module determines a phase value at a camera pixel. The phase determination module determines an intersection between the flat plane of the phase value and the camera pixel to identify a ray-plane intersection.

Other aspects include corresponding methods, systems, apparatus, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
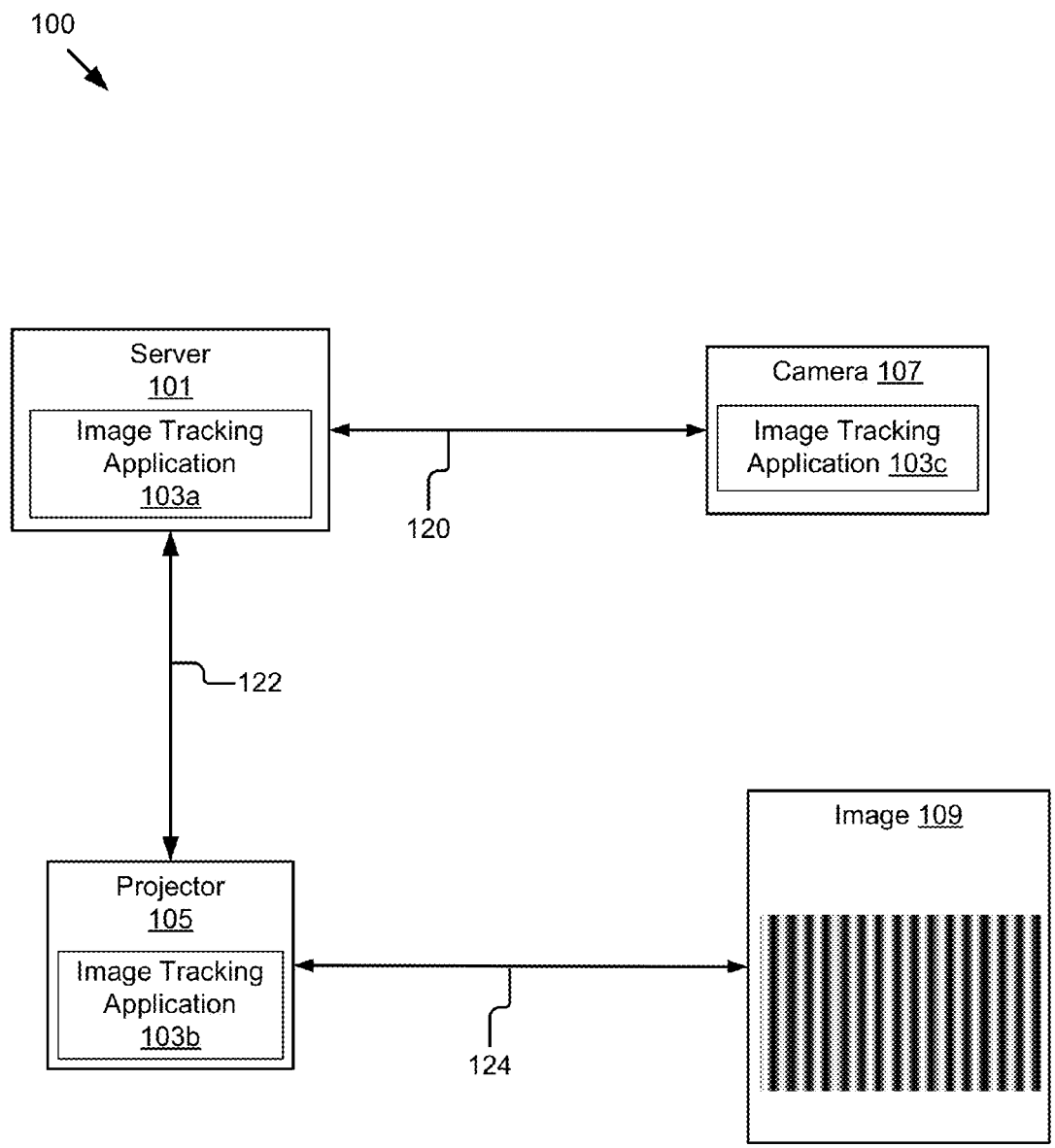
FIG. 1 illustrates an embodiment of a system for determining the three-dimensional position of a point.

A system and method for pre-calculating sine waves for pixel values is described. In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. For example, one embodiment is described below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. An exemplary embodiment is implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

System Overview

FIG. 1 illustrates a block diagram of a system 100 for pre-calculating sine waves for pixel values according to some embodiments. The illustrated system 100 includes a server 101, a camera 107, a projector 105 and an image 109.

In one embodiment, an image tracking application 103a may be operable on the server 101. The server 101 can be a hardware server that includes a processor, a memory, network communication capabilities and video/imaging interface capabilities. In some embodiments, the server 101 sends and receives data to and from one or more of the projector 105 and the camera 107. For example, the server 101 may send video or image data to the projector 105 for projecting an image 109. In another example, the server 101 may receive video or image data from the camera 107.

In another embodiment, the image tracking application 103b may be operable on the projector 105. The projector 105 can be a device that includes a processor, a memory, network communication capabilities and video/imaging interface capabilities. In some embodiments, the projector 105 sends and receives data to and from the server 101. The projector 105 receives image data and projects an image 109 to a flat projection surface, e.g., a screen, via a light output 124. The projector 105 includes a projector lens for projecting the image 109 on the screen. In one embodiment, light output 124 can be a visible light. In another embodiment, light output 124 can be a light that is invisible to the human eye, for example, infrared light.

In the illustrated embodiment, the projector 105 and server 101 are coupled via a signal line 122. Signal line 122 may include a wired or wireless connection for transmitting data between the projector 105 and server 101. For example, the projector 105 and server 101 may be coupled via a High-Definition Multimedia Interface (HDMI) or Video Graphics Array (VGA) cable connection. In another example, the projector 105 and server 101 may be coupled via an IEEE 802.11 Wifi connection where the devices include Wifi transceivers. The projector 105 may be configured to receive and project video or image data in various formats.

In yet another embodiment, the image tracking application 103c may be operable on the camera 107. The camera 107 can be a device that includes a processor, a memory, network communication capabilities and video/imaging interface capabilities. In some embodiments, the camera 107 sends and receives data to and from the server 101. The camera 107 includes a photographic lens and visible light sensor for capturing an image 109. The camera 107 captures an image 109 that can be projected via light output 124. In one embodiment, the camera 107 includes a photographic lens for capturing light output 124 that includes visible light. In another embodiment, the camera 107 includes an infrared lens and infrared light sensor for capturing light output 124 that includes infrared light.

In the illustrated embodiment, the camera 107 and server 101 are coupled via a signal line 120. For example, the camera 107 and server 101 may be coupled via a High-Definition Multimedia Interface (HDMI) or Universal Serial Bus (USB) cable connection. In another example, the camera 107 and server 101 may be coupled via an IEEE 802.11 Wifi connection where the devices include Wifi transceivers. In an embodiment, the camera and server may be coupled via Ethernet (IEEE802.3) where the devices include Ethernet transceivers. The camera 107 may be configured to capture the image 109 in various formats.

In one embodiment, the projector 105 and the camera 107 are combined into a single device. For example, the single device can be a projector 105 with a camera 107 that is rigidly attached to the housing of the projector 105. The camera 107 may be attached to the projector 105 in a manner that facilitates capturing the image 109.

In some embodiments, the image tracking application 103 determines a plurality of sinusoidal images where a constant phase represents a flat plane in a three-dimensional space. The image tracking application 103 causes the projector 105 to project the plurality of sinusoidal images to be captured by the camera 107. The image tracking application 103 determines a phase value at a camera pixel. The image tracking application 103 determines an intersection between the flat plane of the phase value and the camera pixel to identify a ray-plane intersection. The image tracking application 103 is described below in more detail with reference to FIGS. 2-7.

Image Tracking Application

Figure 2A:
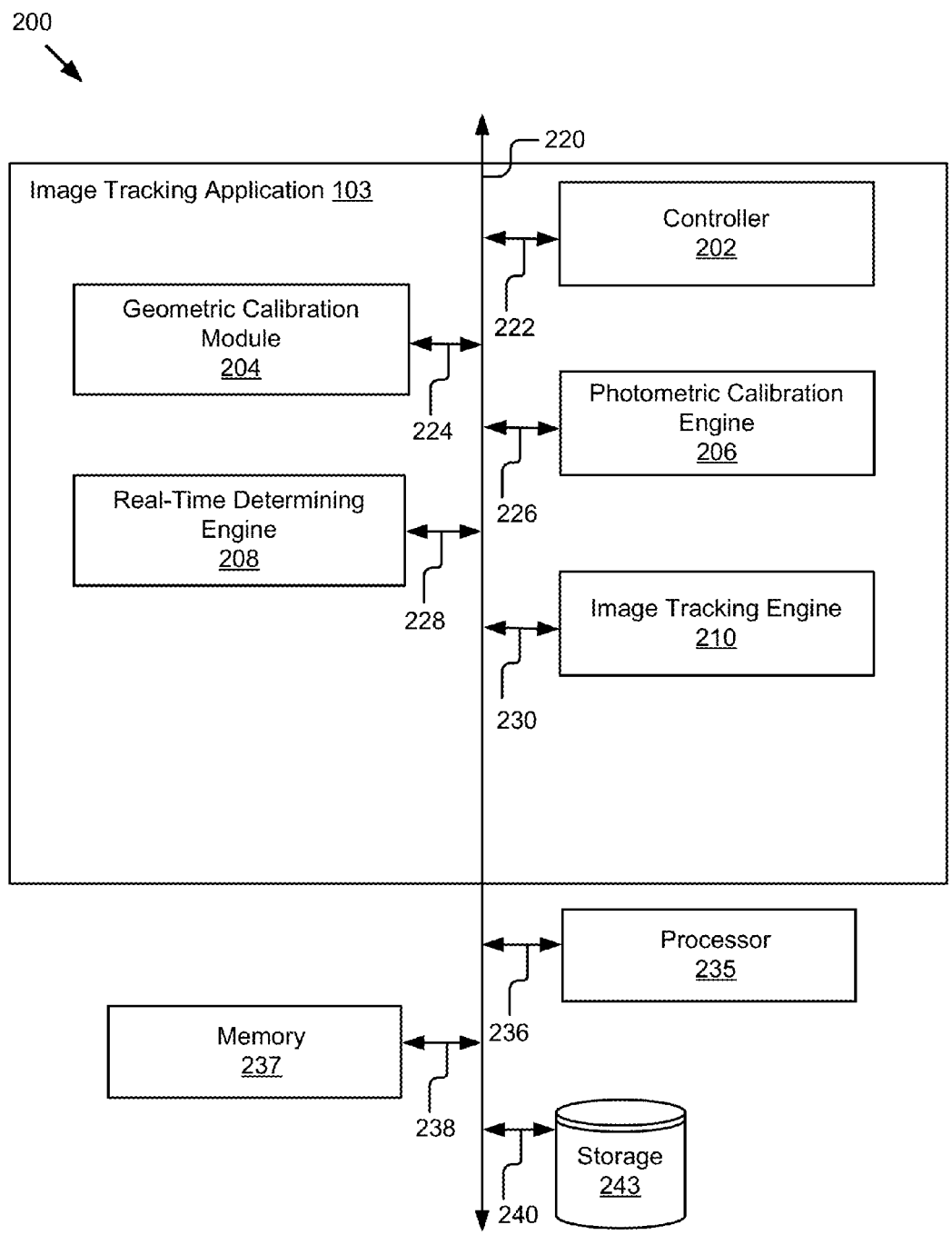
FIG. 2A is a block diagram of an embodiment of an image tracking application.

Referring now to FIG. 2A, an example of the image tracking application 103 is shown in more detail. FIG. 2A is a block diagram of a computing device 200 that includes the image tracking application 103, a processor 235, a memory 237 and a storage 243. The components of the computing device 200 are communicatively coupled by a bus 220. In one embodiment, the functionality of the bus 220 is provided by an interconnecting chipset. In some embodiments, the computing device 200 can be one of a server 101, a projector 105 and a camera 107.

The processor 235 includes an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may include various computing architectures including a complex instruction set computer (CISC) architecture, a reduced instruction set computer (RISC) architecture, or an architecture implementing a combination of instruction sets. Although FIG. 2A includes a single processor 235, multiple processors 235 may be included. Other processors, operating systems, sensors, displays and physical configurations are possible.

The memory 237 stores instructions and/or data that may be executed by the processor 235. The memory 237 is coupled to the bus 220 for communication with the other components via signal line 238. The instructions and/or data may include code for performing the techniques described herein. The memory 237 may be a dynamic random access memory (DRAM) device, a static random access memory (SRAM) device, flash memory or some other memory device. In some instances, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The storage 243 can be a non-transitory memory that stores data for providing the functionality described herein. The storage 243 is communicatively coupled to the bus 220 via signal line 240. The storage 243 may be a dynamic random access memory (DRAM) device, a static random access memory (SRAM) device, flash memory or some other memory devices. In some instances, the storage 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the storage 243 stores calibration data associated with the projector 105 and/or the camera 107. For example, the storage 243 stores intrinsic calibration information including projector and camera geometry parameters associated with the lenses and image sensors and image generators of the projector 105 and/or the camera 107. In another example, the storage 243 stores extrinsic calibration information including a position of the camera 107 with respect to the projector 105. In yet another example, the storage 243 stores photometric calibration information that describes a linear response between an input image and image data captured by the camera 107. The photometric calibration may include data describing a linear relationship between a pixel value and the brightness of a pixel in order to identify the exact phase of a projected pixel.

In one embodiment, the storage 243 stores ray equations for each pixel in a lookup table (LUT). In another embodiment, the storage 243 stores projector pixel column plane equations in a LUT. In other embodiments, the storage 243 stores data for calculating intersections between rays and planes. For example, the storage 243 stores a LUT for calculating an intersection between a ray and a plane. The LUT may store the coordinates for each plane and ray. In some embodiments, the storage 243 stores image data. The image data may include phase images that are transmitted to and projected by the projector 105. The image data may include video or images that are captured by the camera 107.

The image tracking application 103 includes: a controller 202, a geometric calibration module 204, a photometric calibration engine 206, a real-time determining engine 208 and an image tracking engine 210. These components of the image tracking application 103 are communicatively coupled to each other via the bus 220.

The controller 202 can be software including routines for handling communications between the image tracking application 103, other components of the computing device 200 and other entities of the system 100. In some embodiments, the controller 202 can be a set of instructions executable by the processor 235 to provide the functionality described below for handling communications between the image tracking application 103, other components of the computing device 200 and other entities of the system 100. In other embodiments, the controller 202 can be stored in the memory 237 of the computing device 200 and can be accessible and executable by the processor 235. The controller 202 may be adapted for cooperation and communication with the processor 235 and other components of the computing device 200 via signal line 222.

The controller 202 handles communication between the image tracking application 103, other components of the computing device 200 and other entities of the system 100. In some embodiments, the controller 202 receives data from a camera 107. For example, the controller 202 receives intrinsic calibration information associated with the camera 107. In another example, the controller 202 receives image data from the camera 107. In one embodiment, the image data may be for tracking an object in a scene. The controller 202 may store the data from the camera 107 in storage 243.

In some embodiments, the controller 202 sends data to the projector 105 for projecting the image 109. For example, the controller 202 sends image data including a plurality of phase images to the projector 105. The projector 105 processes the image data to project the image data. In some embodiments, the controller 202 receives data from the projector 105. For example, the controller 202 receives intrinsic calibration information associated with the projector 105. The controller 202 receives the intrinsic calibration information from the projector 105, the camera 107 or a calibration system. In one embodiment, the calibration information is calculated based on a series of calibration steps well known in the art. One example of those calibration steps is from a published paper by Z. Zhang at Microsoft and is published as Z. Zhang, "A flexible new technique for camera calibration," IEEE Transactions on Pattern Analysis and Machine Intelligence, 22(11):1330-1334, 2000. The controller 202 may store the intrinsic calibration information in storage 243.

The geometric calibration module 204 can be software including routines for calibrating the projector 105 and the camera 107. In some embodiments, the geometric calibration module 204 can be a set of instructions executable by the processor 235 to provide the functionality described below for calibrating the projector 105 and the camera 107 in conjunction with actions from a user. In other embodiments, the geometric calibration module 204 can be stored in the memory 237 of the computing device 200 and can be accessible and executable by the processor 235. The geometric calibration module 204 may be adapted for cooperation and communication with the processor 235 and other components of the computing device 200 via signal line 224.

The geometric calibration module 204 receives calibration information for performing geometric calibration. In one embodiment, the geometric calibration module 204 receives the calibration information from the projector 105 or the camera 107 via the controller 202. In another embodiment, the geometric calibration module 204 retrieves the calibration information from the storage 243. The calibration information may include intrinsic calibration information. For example, the intrinsic calibration information may include projector and camera parameters associated with the lens of the projector 105 and/or the camera 107. The intrinsic calibration information includes the internal geometry of the camera lens and image sensor, including enough information to calculate the view direction of each pixel in the image sensor of the camera. The intrinsic calibration information includes the internal geometry of the projector lens and image generator, including enough information to calculate the direction each pixel of the image generator will send light when it is activated. The calibration information may include extrinsic calibration information. For example, the calibration may include pose information and position information of the projector 105 and camera 107. The calibration information includes enough detail to completely determine the geometric relationship between each camera image sensor ray and each projector image projection ray.

In one embodiment, the geometric calibration module 204 involves a user physically moving a checkerboard image in front of the camera/projector system. This can be done once at the factory if the projector and camera are a single unit and are fixed with respect to one another once shipped. In one embodiment, the geometric calibration module 204 performs automated calibration the factory, stores the calibration information in storage 243 and accesses that information during operation. In another embodiment, the calibration is performed by a user after the camera/projector system is purchased.

In one embodiment, the geometric calibration module 204 performs geometric calibration for the projector 105 and camera 107. Geometric calibration may include performing intrinsic calibration based on the physical design of the projector 105 and/or the camera 107. For example, intrinsic calibration may be based on the physical design of a lens, physical geometry and image generator of the projector 105 or the lens, physical geometry and image sensor of the camera 107. In some embodiments, the geometric calibration module 204 performs intrinsic calibration by mapping three-dimensional points with a known relationship (for instance a checkerboard grid) to a normalized image plane to determine the intrinsic features of the projector 105 and the camera 107, for example, focal length, principle point, pixel size, skew factor and other distortion effects. Frequently, the known relationship of the checkerboard is used to calculate the distance of various pixels in the camera and projector from one another. Once the relationship between many pixels are known, it is possible to create a simplified, parameterized mathematical model of the camera and using that model, calculate the rays associated with each pixel directly. Alternatively, it is possible to put the camera or projector in a device or room with known geometry and identify exactly each ray where a pixel of the image sensor is pointed and where a pixel of the image generator points. For example, with a projector, you can place the projector in a carefully measured position and orientation, turn a single pixel on, leaving the remaining pixels black, and measure two locations lit by the pixel—one near the projector and one farther from the projector. If you know the exact x, y, and z locations of those two measured points with respect to the projector location, you can easily calculate the ray for that one pixel using the two points using the equation:

$$\frac{(x-x_1)}{(x_2-x_1)} = \frac{(y-y_1)}{(y_2-y_1)} = \frac{(z-z_1)}{(z_2-z_1)}$$

where the subscripts 1 and 2 correspond to the two measured points and x, y, and z represent points on the ray. The Zhang approach has the advantage of using fewer measurements and, as a result, is much quicker than measuring pixels one at a time.

The geometric calibration may also include performing extrinsic calibration based on the projector 105 and the camera 107 to take extrinsic parameters including rotation and translation from a world coordinate system to a projector 105 or camera 107 coordinate system. For example, extrinsic calibration may be based on the position of the camera 107 relative to the position of the projector 105. The extrinsic calibration may also be based on the pose of the projector 105 and camera 107 and can use rays from multiple optical devices. In one embodiment, the geometric calibration module 204 may generate geometric parameters based on the extrinsic calibration.

In one embodiment, the geometric calibration module 204 receives N images from the camera 107 that are captured from the projected image displayed by the projector 105. The geometric calibration module 204 identifies a unique code for each image pixel in the N images. For example, the unique code is a reflected binary code called a "Gray code" after the inventor Frank Gray. The geometric calibration module 204 correlates the image pixel with the projector pixel based on the unique code. For example, the geometric calibration module 204 correlates the image pixel (x, y) with the corresponding projector pixel (u, v). The geometric calibration module 204 calculates a ray-ray or ray-plane intersection and determines the position of an object in three-dimensional space. If the object identified is a checkerboard or some other location marker, the results can be used to identify the position of the camera and projector with respect to the location of the marker. Using this information, the position of the camera with respect to the projector can easily be calculated. This information is typically called the "homography" of the camera projector system and is well understood by those with ordinary skill in the art. The geometric calibration module 204 repeats the above steps until the geometric calibration process is complete.

The photometric calibration engine 206 can be software including routines for performing photometric calibration. In some embodiments, the photometric calibration engine 206 can be a set of instructions executable by the processor 235 to provide the functionality described below for performing photometric calibration in conjunction with steps performed by a user. In other embodiments, the photometric calibration engine 206 can be stored in the memory 237 of the computing device 200 and can be accessible and executable by the processor 235. The photometric calibration engine 206 may be adapted for cooperation and communication with the processor 235 and other components of the computing device 200 via signal line 226.

In one embodiment, the photometric calibration engine 206 performs photometric calibration for generating a linear response between an input image from the projector 105 and the image data captured by the camera 107. More specifically, the photometric calibration engine 206 generates a linear relationship between a pixel value displayed by the projector 105 and the brightness of a pixel captured by the camera 107. The relationship varies by location of the pixel due to a vignetting effect where the brightness of pixels on the edge of an image are typically darker than those in the center. The brightness can also vary due to the reflectivity profile of surfaces like the screen. In some embodiments, the photometric calibration parameters are its intensity transfer function and a spatial intensity variation function. The photometric calibration engine 206 performs the calibration so that it can identify which part of the sine wave was captured using the camera.

In one embodiment, a user controls the lighting and position of the camera 107 and the projector 105 during photometric calibration while the photometric calibration engine 206 performs the calibration. The photometric calibration can be done once at the factory and the parameters are stored in storage 243 for later retrieval. In another embodiment, the photometric calibration is performed after the camera/projector system is purchased.

The real-time determining engine 208 can be software including routines for pre-calculating sine waves for pixel values. In some embodiments, the real-time determining engine 208 can be a set of instructions executable by the processor 235 to provide the functionality described below for calculating sine waves for pixel values. In other embodiments, the real-time determining engine 208 can be stored in the memory 237 of the computing device 200 and can be accessible and executable by the processor 235. The real-time determining engine 208 may be adapted for cooperation and communication with the processor 235 and other components of the computing device 200 via signal line 228. The real-time determining engine 208 is described below in more detail with reference to FIG. 2B.

Figure 2B:
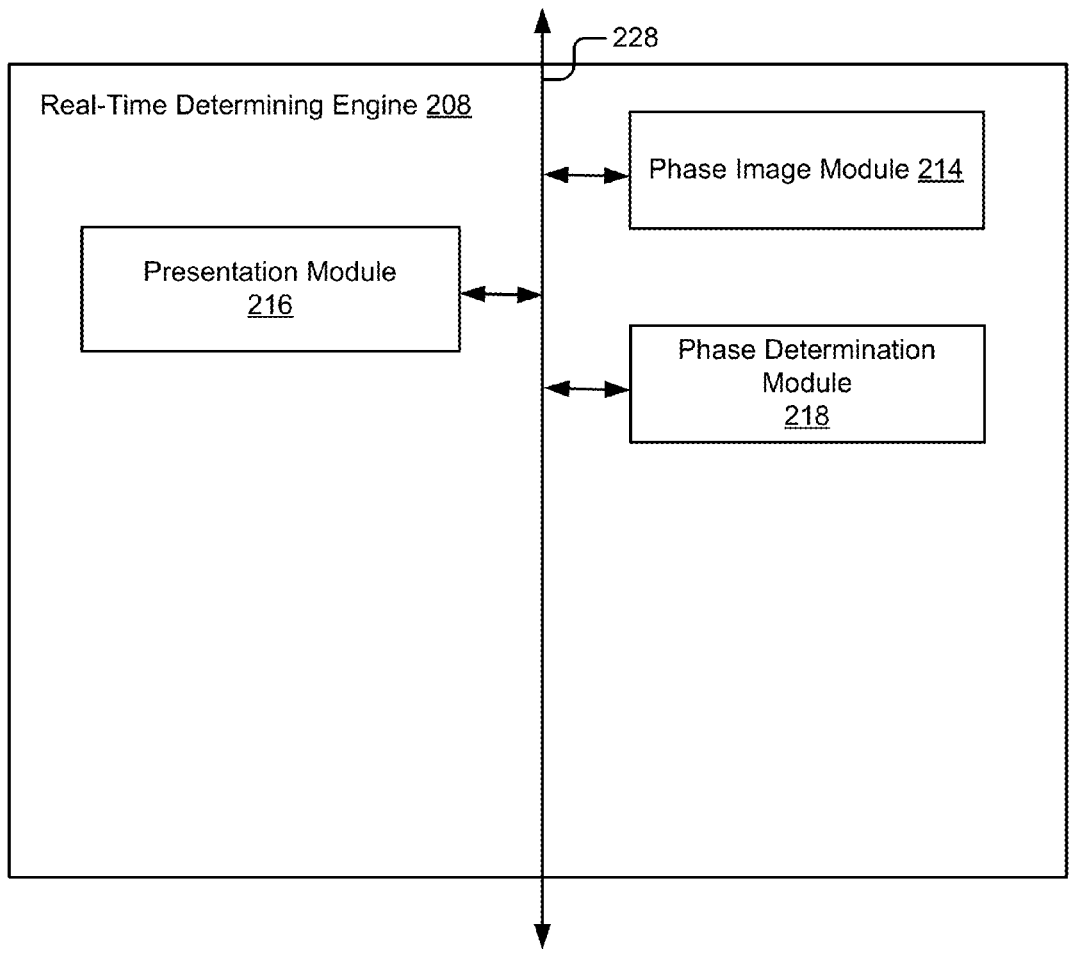
FIG. 2B is a block diagram of an embodiment of a real-time determining engine.

FIG. 2B is a block diagram of one embodiment of a real-time determining engine 208. In one embodiment, the real-time determining engine 208 includes a phase image module 214, a presentation module 216 and a phase determination module 218. However, in other embodiments, the real-time determining engine 208 can include different and/or additional modules than the ones depicted in FIG. 2B.

The phase image module 214 receives projector geometry parameters associated with the projector 105. In one embodiment, the phase image module 214 receives the projector geometry parameters from the projector 105 via the controller 202. In another embodiment, the phase image module 214 receives the projector geometry parameters from the geometric calibration module 204. In yet another embodiment, the phase image module 214 retrieves the projector geometry parameters from storage 243 because the information is present as a factory setting.

The phase image module 214 determines a plurality of sinusoidal images where a constant phase represents a flat plane in three-dimensional space when projected by a projector 105. The phase image module 214 performs this step to determine the location of phase images in world coordinates. For example, the system may be configured to display a phase diagram where the {0,0,0} position $P_1$ in world coordinates corresponds to 0 radians in the sine wave. This corresponds to halfway between the maximum and minimum intensity of the projector. The system may also be configured to display the peak intensity ($\pi/2$ radians) at the {1,0,0} position $P_2$ in world coordinates. The geometric calibration information from the projector 105 can be used to calculate which pixel is responsible for lighting up $P_1$ and $P_2$. If $P_1$ corresponds to pixel (640, 355) in the projector then that pixel will be set at the value 127, halfway between 0 and 255. If $P_2$ corresponds to pixel (640,385) in the projector 105, that pixel will be set to 255, the peak intensity value. The phase image module 214 may determine the shifted phase diagrams by calculating the expected position in world coordinates for each pixel in the projector based on the intrinsic and extrinsic geometry. The images may appear distorted if displayed on a liquid crystal display (LCD) because there is some distortion in the optics of most projectors.

Figure 3A:
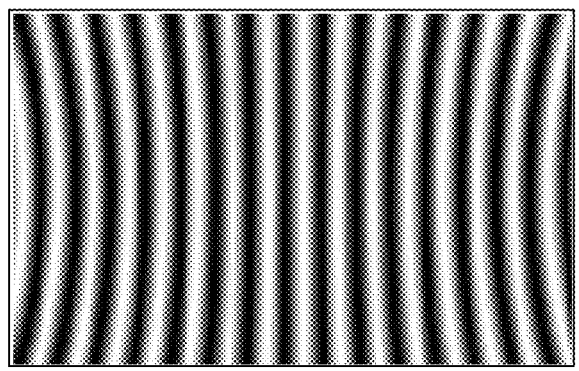
FIGS. 3A-3C are example embodiments of radial distortion in images.
Figure 3B:
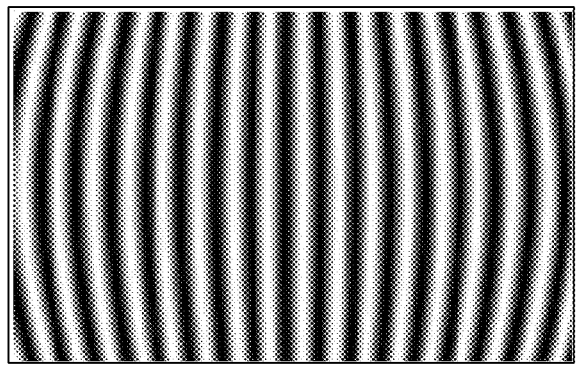
Figure 3C:
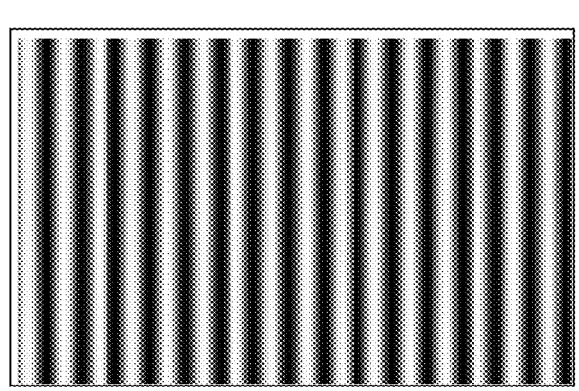

For example, FIG. 3A illustrates the input image that might be sent to the projector 105, which includes what is frequently called "pin-cushion" distortion if the projector normally exhibits a form of radial distortion that expands the parts of the image that are some distance from the center of projection. Sending a "pin-cushion" image to the projector counteracts the radial distortion and the projected image looks more like FIG. 3C. If the projector exhibits a form of radial distortion which tends to draw the pixels toward the center, FIG. 3B illustrates an image that would be sent to the projector 105. The goal is to create a version of the image whose columns project along flat planes as illustrated in FIG. 3C by taking into account the distortion inherent in the projector design.

The presentation module 216 instructs the projector 105 to project the plurality of sinusoidal images to be captured by a camera 107.

The phase determination module 218 determines a phase of the sine wave at a camera pixel. In one embodiment, the phase determination module 218 determines the phase value based on photometric calibration information and the sinusoidal image projected by the projector 105 onto a target object. The photometric calibration information describes a linear relationship between a pixel value and the brightness of a pixel in order to identify the exact phase of a projected pixel.

For example, typically the projected pattern is generated by $$I_n^p(x^p, y^p) = A^p(x^p, y^p) + B^p(x^p, y^p)\cos\left(2\pi f x^p - \frac{2\pi n}{N}\right)$$

where "$I_n^p(x^p,y^p)$" represented the intensity of the projector pixel, "$(x^p,y^p)$" represents the projector pixel, "$2\pi f x^p$" represents the phase of the projector pixel and $$"\frac{2\pi n}{N}"$$

represents the projector time-shift. In this embodiment, the pixel values are generated based on where the pixels project into the world coordinate system as described before. The captured pattern is represented by $$I_n^c(x^c, y^c) = A^c(x^c, y^c) + B^c(x^c, y^c)\cos\left(\phi(x^c, y^c) - \frac{2\pi n}{N}\right)$$

where "$I_n^c(x^c,y^c)$" represents the intensity of a camera pixel, "$(x^c,y^c)$" represents the camera pixel, "$(x^c,y^c)$" represents the unknown phase of the camera pixel and $$"\frac{2\pi n}{N}"$$

represents the known time-shift. The phase is computed by combining these equations to obtain $$\phi = \tan^{-1}\left[\frac{\sum_{n=0}^{N-1} I_n^c \sin\left(\frac{2\pi n}{N}\right)}{\sum_{n=0}^{N-1} I_n^c \cos\left(\frac{2\pi n}{N}\right)}\right]$$

where "$\phi$" is the phase.

Because the pixel values were calculated based on the world coordinate system instead of the pixel coordinate system in the projector, the phase value corresponds to the flat plane in a space. The phase determination module 218 determines an intersection between the flat plane of the phase value and a ray formed by the camera pixel.

For example, where the parametric definition of two rays is $r_1(t_1)=p_1+t_1d_1$ and $r_2(t_2)=p_2+t_2d_2$, solving for $t_1$ yields the following equations: $r_1(t_1r_1(t_1)=r_2(t_2)$, $p_1+t_1d_1=p_2+t_2d_2$, $t_1d_1=p_2+t_2d_2-p_1$, $(t_1d_1)\times d_2=(p_2+t_2d_2-p_1)\times d_2$, $t_1(d_1\times d_2)=(t_2d_2)\times d_2+(p_2-p_1)\times d_2$, $t_1(d_1\times d_2)=t_2(d_2\times d_2)+(p_2-p_1)\times d_2$, $t_1(d_1\times d_2)=t_20+(p_2<p_1)\times d_2$, $t_1(d_1\times d_2)=(p_2-p_1)\times d_2$, $t_1(d_1\times d_2)*(d_1\times d_2)=((p_2-p_1)\times d_2)$, $$t_1 = \frac{((p_2-p_1)\times d_2)\bullet(d_1\times d_2)}{\|d_1\times d_2\|^2} \text{ and } t_2 = \frac{((p_2-p_1)\times d_1)\bullet(d_1\times d_2)}{\|d_1\times d_2\|^2}.$$

If rays are coincident or parallel, $(d_1\times d_2)$ is (0, 0, 0) and there is no intersection point. If the rays are skew and do not intersect, $r_1(t_1)$ and $r_2(t_2)$ are the points of closest approach.

Planes can be represented as a normal vector and a distance from the origin in world coordinate space, for example, as four floating point values. A line in three-dimensional space can be represented as 6 floating point values including a direction vector and a point on the line. A ray can be represented as an origin point and a direction vector as in the previous paragraph. In one embodiment, the phase determination module 218 stores the ray equation in a lookup table (LUT) for each camera pixel, stores the phase plane equation in the LUT and identifies the intersection of a ray of the camera pixel and the flat plane. The coordinates may be retrieved from a LUT stored on storage 243.

It is possible to calculate the intersection of a ray and a plane using the six floating point values that represent a ray and the four floating point values that represent a plane. One way to represent the line is with an equation $p=dl+l_0$ $d \in R$ where p is a point on the line, d is a real number, l is a vector giving the direction of the line and $l_0$ is a point on the line. An alternative to the four floating point representation of the plane is expressed by the vector equation $(p-p_0) \cdot n=0$ where $p_0$ is a point on the plane and n is a vector perpendicular to the plane. Substitute the line into the plane equation to find the intersection: $(dl+l_0-p_0) \cdot n=0$ and solve for d:

$$d = \frac{(p_0 - l_0) \cdot n}{l \cdot n}.$$

Put d back into the equation of the line to find the intersection point.

This is a different approach from prior art systems that attempt to remove distortion errors by approximating the shape of the projected column. In prior art systems, a column of projector pixels is given the same phase value or image intensity value. The column of pixels does not correspond to a flat plane in space due to radial distortion. This means that for prior art systems, in order to calculate a precise intersection between the non-flat phase surface and the image pixel ray, the curved phase surface would have to be approximated, for example, using polygons or analytically. This results in either inaccurate calculations or calculations that are too slow for real-time tracking applications.

The image tracking engine 210 can be software including routines for tracking objects in a scene and instructing a display to display a new image based on the tracking. In some embodiments, the image tracking engine 210 can be a set of instructions executable by the processor 235 to provide the functionality described below for tracking objects in a scene. In other embodiments, the image tracking engine 210 can be stored in the memory 237 of the computing device 200 and can be accessible and executable by the processor 235. The image tracking engine 210 may be adapted for cooperation and communication with the processor 235 and other components of the computing device 200 via signal line 230.

In one embodiment, the image tracking engine 210 receives images of a user from a camera 107 via the controller 202. The image tracking engine 210 identifies the position of the user's hand based on the images. The image tracking engine 210 detects a direction of motion of the hand. The image tracking engine 210 provides the display with a new image based on the direction of motion.

Methods

Figure 4:
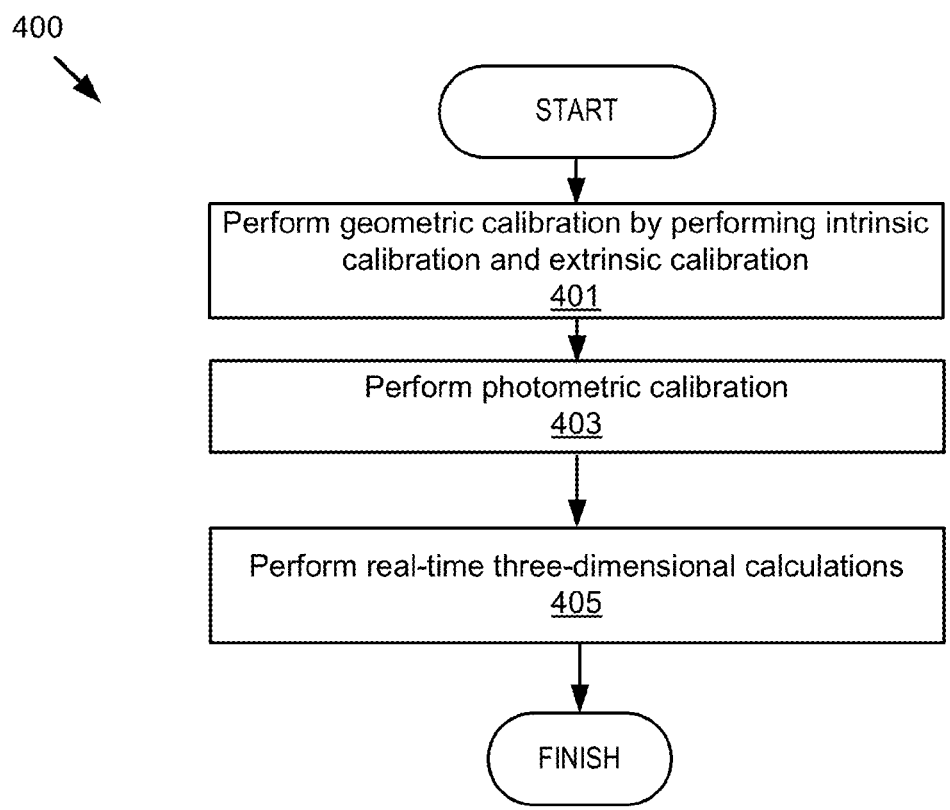
FIG. 4 is a flow diagram of an embodiment of a method for capturing three-dimensional data.

FIG. 4 is a flow diagram 400 of an embodiment of a method for capturing three-dimensional data. The geometric calibration module 204 performs 401 geometric calibration by performing intrinsic calibration and extrinsic calibration. The photometric calibration engine 206 performs 403 photometric calibration. The real-time determining engine 208 performs 405 real-time three-dimensional calculations. Step 401 is described in more detail below in FIG. 5. Step 405 is described below in more detail in FIG. 6.

Figure 5:
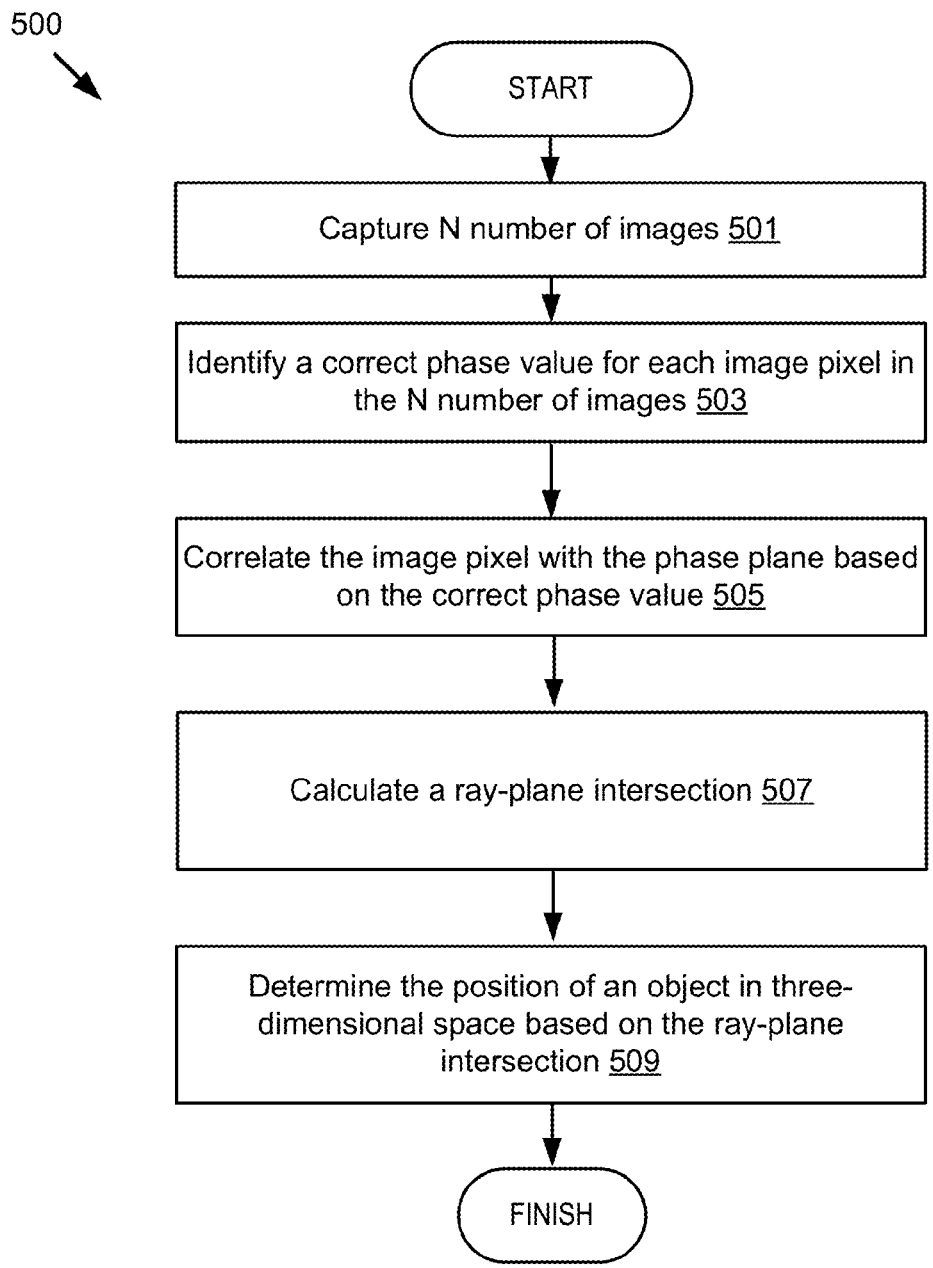
FIG. 5 is a flow diagram of an embodiment of a method for tracking objects in 3 dimensions using shifted phase profilometry.

FIG. 5 is a flow diagram 500 of an embodiment of a method for tracking objects in three dimensions using shifted phase profilometry. The camera 107 captures 501 N number of images. The controller 107 may receive the N number of images. The geometric calibration module 204 identifies 503 the correct phase value for each image pixel in the N number of images. In one embodiment, the camera captures six images—three images with a large number of cycles, for example 16 cycles of a sinusoidal image and three images with a unit cycle of a sinusoidal image. The three 16 cycle images provide higher phase accuracy than the three unit cycle images and the three unit cycle images provide a method for identifying which of the 16 cycles the pixel is looking at. In other words, the unit cycle images are used for unwrapping the phase of the 16 cycle images and the combination gives improved accuracy. The geometric calibration module 204 correlates 505 the image pixel with the phase plane based on the phase values. For example, the projector 105 projects six sinusoidal images. The geometric calibration module 204 calculates 507 a ray-plane intersection. The real-time determining engine 208 determines the position of an object in three-dimensional space based on the ray-plane intersection.

Figure 6:
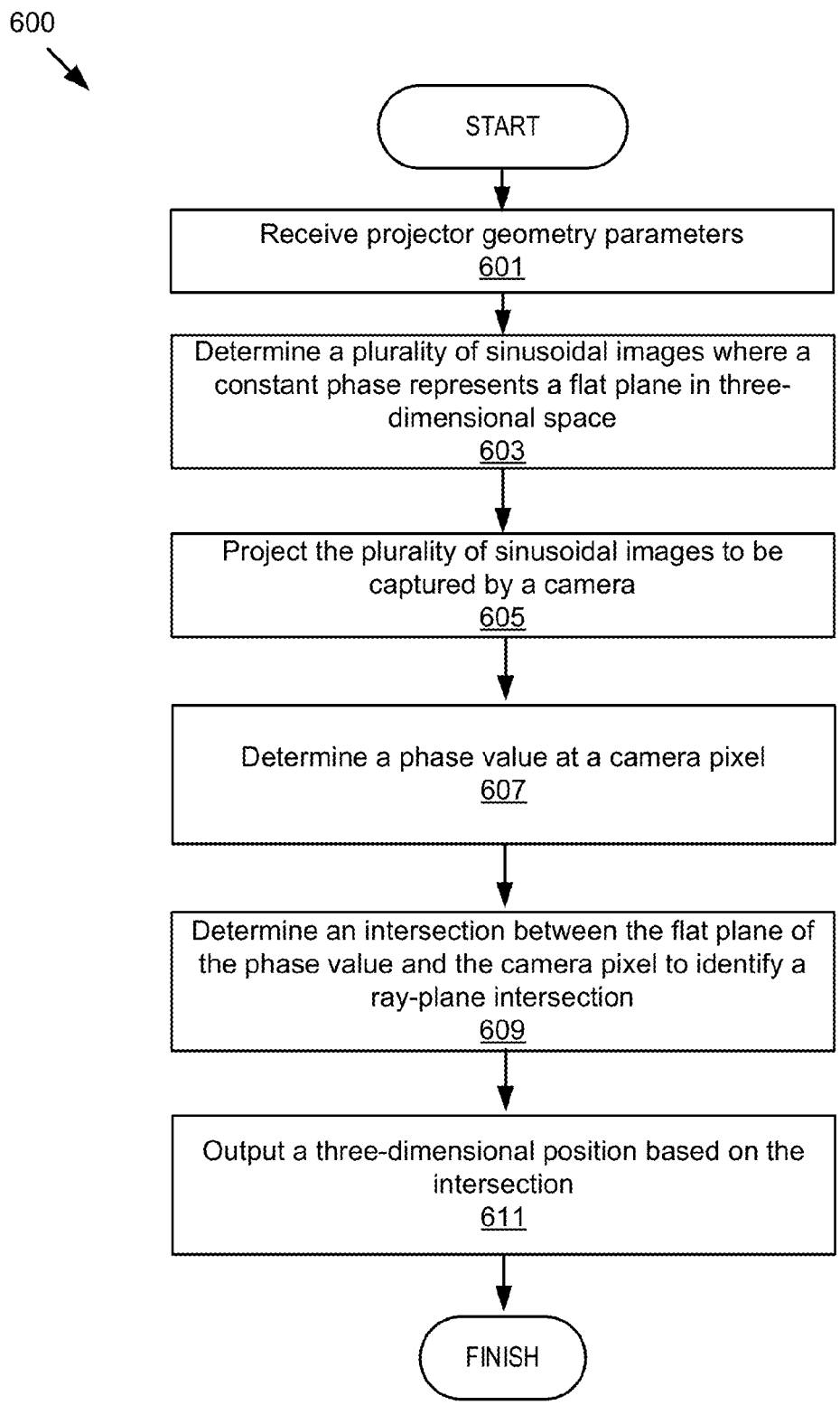
FIG. 6 is a flow diagram of an exemplary embodiment of a method for performing photometric calibration.

FIG. 6 is a flow diagram 600 of an exemplary embodiment of a method for determining a three-dimensional position. The controller 202 receives 601 projector geometry parameters. The phase module 214 determines 603 a plurality of sinusoidal images where a constant phase represents a flat plane in three-dimensional space. A presentation module 216 instructs the projector 105 to project 605 the plurality of sinusoidal images to be captured by a camera 107. The phase determination module 218 determines 607 a phase value at a camera pixel. The phase determination module 218 determines 609 an intersection between the flat plane of the phase value and the camera pixel to identify a ray-plane intersection. The phase determination module 218 outputs 611 a three-dimensional position based on the ray-plane intersection.

Figure 7:
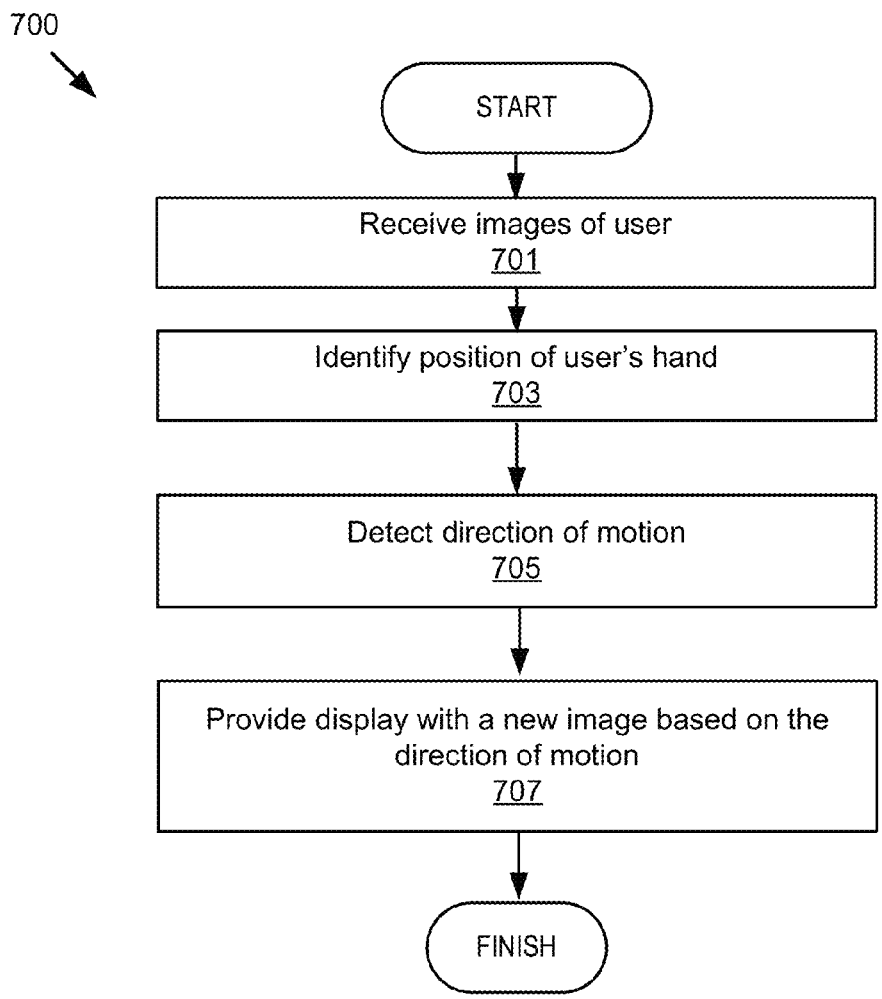
FIG. 7 is a flow diagram of an embodiment of a method for tracking an object in three-dimensional space.
Figure 8:
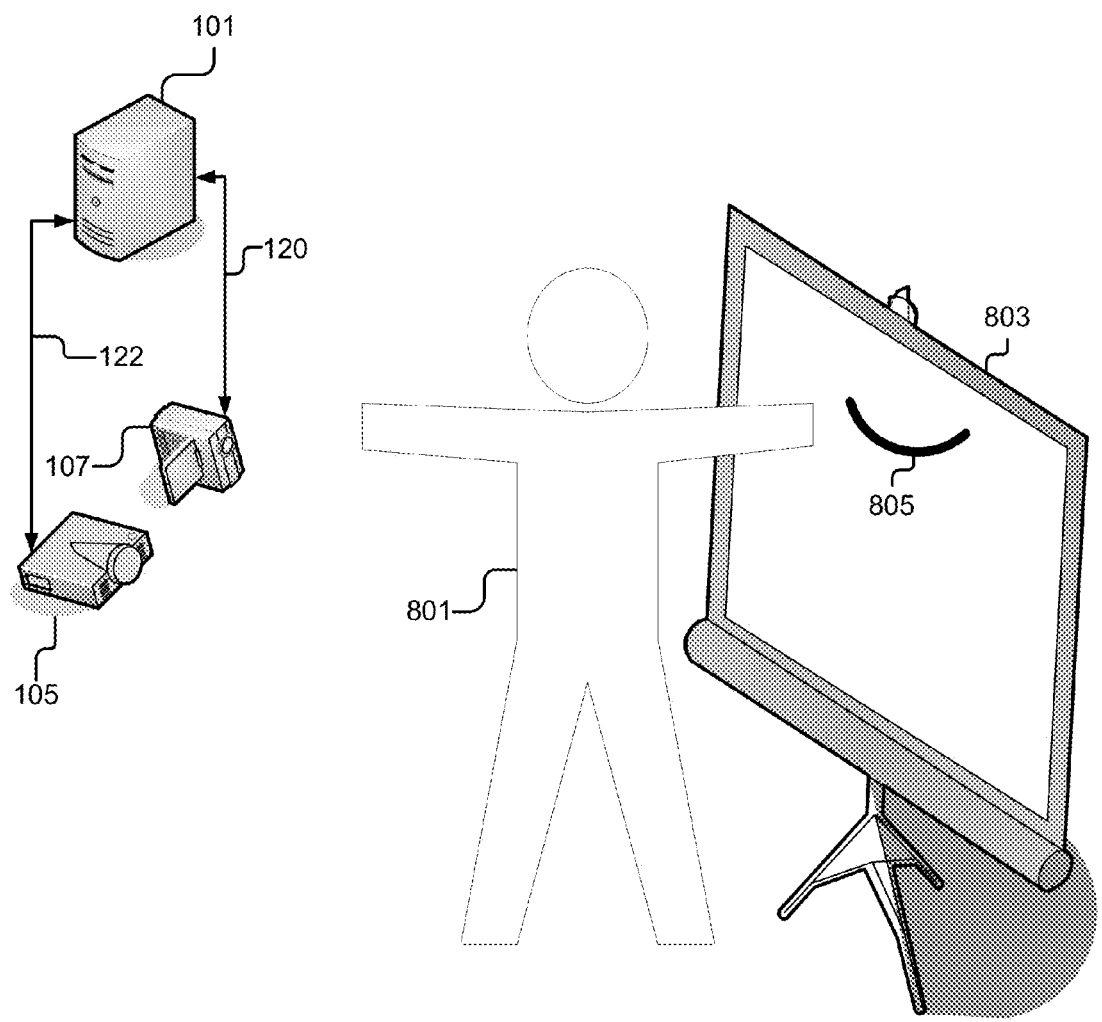
FIG. 8 is a diagram illustrating an embodiment of an example real-time interactive whiteboard system.

FIG. 7 is a flow diagram 700 of an embodiment of a method for tracking an object in three-dimensional space. FIG. 8 is an example of the display 803 described in FIG. 7. In this example, a display system is used to display a map for a weatherman but persons of ordinary skill in the art will recognize that there are many application associated with this method. In some embodiments, the projector 105 comprises two projectors: one for projecting the pattern for performing the three-dimensional tracking and one for displaying content. In some embodiments, a single projector 105 performs both tasks, for example, by displaying the sinusoidal pattern in infrared and displaying the content using visible light. In some embodiments an LCD panel is used to display an image and the projector displays infrared sinusoidal patterns for tracking Persons of ordinary skill in the art will recognize that multiple approaches are possible.

The image tracking engine 210 receives 701 images of a user from a camera 107. The images are of a sinusoidal pattern projected onto a user's hand moving in front of a display. In some embodiments, the image tracking engine 210 receives 701 images via the controller 202. The image tracking engine 210 identifies 703 the position of the user's hand. The image tracking engine 210 detects 705 the direction of motion of the user's hand. For example, the user moves his hand from left to right. The image tracking engine 210 provides 707 the display 803 with a new image based on the direction of motion of the user's hand. In one embodiment, the new image includes content based on the direction of motion. For example, the user's hand moving from left to right is displayed as a cloud that moves over a map from left to right.

FIG. 8 is a diagram illustrating an embodiment of an example real-time interactive whiteboard system. The image tracking engine 210 receives images of a user 801 standing in front of display 803 from a camera 107. The image tracking engine 210 identifies the position of the hand of the user 801 based on the images. The image tracking engine 210 detects a direction of motion of the hand of the user 801. The image tracking engine 210 provides the display 803 with a new image based on the direction of motion. In one embodiment, the new image includes content 805 based on the direction motion. In one embodiment, the whiteboard system may be used in a classroom setting. User 801 may be professor or student. User 801 may make annotations on the display 803 based on the position and direction of motion of a hand of user 801. For example, a teacher may make annotations during a math lesson.

The foregoing description of the embodiments has been presented for the purposes of illustration and description. It is not intended to be exhaustive or to limit the present embodiments to the precise forms disclosed. Many modifications and variations are possible in light of the above teaching. It is intended that the scope of the present embodiments be limited not by this detailed description, but rather by the claims of this application. As will be understood by those familiar with the art, the present embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent, the modules, routines, features, attributes, methodologies and other aspects of the embodiments can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the embodiments are in no way limited to implementation in any specific programming language, or for any specific operating system or environment. Accordingly, the disclosure is intended to be illustrative, but not limiting, of the scope, which is set forth in the following claims.

What is claimed is:

1. A method comprising:
    receiving projector geometry parameters;
    determining a plurality of sinusoidal images each having a constant phase along a vertical direction, wherein the constant phase when projected by a projector, represents a flat plane corresponding to a column of projector pixels in a three-dimensional space based on the projector geometry parameters;
    instructing the projector to project the plurality of sinusoidal images onto an object to be captured by a camera;
    generating a linear relationship between a pixel value associated with the plurality of sinusoidal images projected by the projector and a brightness of a camera pixel captured by the camera, wherein the linear relationship varies by location of the camera pixel;
    determining a phase value of a projected sinusoidal image at the camera pixel based on the linear relationship; and
    determining an intersection between the flat plane corresponding to the column of projector pixels based on the phase value and a ray formed by the camera pixel to identify a ray-plane intersection.

2. The method of claim 1, further comprising:
    outputting a three-dimensional position of the object based on the ray-plane intersection.

3. The method of claim 1, further comprising:
    receiving N number of images;
    identifying a correct phase value for each image pixel in the N number of images;
    correlating the image pixel with a phase plane based on the correct phase value;
    calculating a ray-plane intersection; and
    determining a position of an object in the three-dimensional space based on the ray-plane intersection.

4. The method of claim 3, further comprising:
    receiving images of a user;
    identifying a position of the user's hand;
    determining a direction of motion of the hand; and
    providing a new image to a display based on the direction of motion.

5. The method of claim 1, further comprising determining a position of the camera pixel in the three-dimensional space based on the ray-plane intersection.

6. The method of claim 1, further comprising storing a ray equation for each camera pixel and a phase plane equation in a lookup table.

7. A system comprising:
    a controller configured to receive projector geometry parameters;
    a phase image module communicatively coupled to the controller, the phase image module configured to determine a plurality of sinusoidal images each having a constant phase along a vertical direction, wherein the constant phase when projected by a projector, represents a flat plane corresponding to a column of projector pixels in a three-dimensional space based on the projector geometry parameters;
    a presentation module communicatively coupled to the controller and the phase image module, the presentation module configured to instruct the projector to project the plurality of sinusoidal images onto an object to be captured by a camera;
    a photometric calibration engine, communicatively coupled to the controller, the photometric calibration engine configured to generate a linear relationship between a pixel value associated with the plurality of sinusoidal images projected by the projector and a brightness of a camera pixel captured by the camera, wherein the linear relationship varies by location of the camera pixel; and
    a phase determination module communicatively coupled to the controller, the phase determination module configured to determine a phase value of a projected sinusoidal image at the camera pixel, based on the linear relationship, and determine an intersection between the flat plane corresponding to the column of projector pixels based on the phase value and a ray formed by the camera pixel to identify a ray-plane intersection.

8. The system of claim 7, wherein the phase determination module is further configured to output a position of the object in three-dimensional space based on the ray-plane intersection.

9. The system of claim 7, wherein the controller is further configured to receive N number of images and the system further comprising:
a real-time determining engine communicatively coupled to the controller, the real-time determining engine configured to identify a correct phase value for each image pixel in the N number of images, correlate the image pixel with a phase plane based on the correct phase value, calculate a ray-plane intersection and determine a position of an object in the three-dimensional space based on the ray-plane intersection.

10. The system of claim 9, wherein the controller is further configured to receive images of a user and the system further comprising:
an image tracking engine communicatively coupled to the controller, the image tracking engine configured to identify a position of a hand of the user, determine a direction of motion of the hand and provide a new image to a display based on the direction of motion.

11. The system of claim 7, wherein the phase determination module is further configured to determine a position of the camera pixel in the three-dimensional space based on the ray-plane intersection.

12. The system of claim 7, further comprising a storage device communicatively coupled to the phase determination module, the storage device configured to store a ray equation for each camera pixel and a phase plane equation in a lookup table.

13. A computer program product comprising a non-transitory computer usable medium including a computer readable program, wherein the computer readable program when executed on a computer causes the computer to:
receive projector geometry parameters;
determine a plurality of sinusoidal images each having a constant phase along a vertical direction, wherein the constant phase when projected by a projector, represents a flat plane corresponding to a column of projector pixels in a three-dimensional space based on the projector geometry parameters;
instruct the projector to project the plurality of sinusoidal images onto an object to be captured by a camera;
generate a linear relationship between a pixel value associated with the plurality of sinusoidal images projected by the projector and a brightness of a camera pixel captured by the camera, wherein the linear relationship varies by location of the camera pixel;
determine a phase value of a projected sinusoidal image at the camera pixel based on the linear relationship; and
determine an intersection between the flat plane corresponding to the column of projector pixels based on the phase value and a ray formed by the camera pixel to identify a ray-plane intersection.

14. The computer program product of claim 13, further causing the computer to output a position of the object in three-dimensional space based on the ray-plane intersection.

15. The computer program product of claim 13, further causing the computer to:
receive N number of images;
identify a correct phase value for each image pixel in the N number of images;
correlate the image pixel with a phase plane based on the correct phase value;
calculate a ray-plane intersection; and
determine a position of an object in the three-dimensional space based on the ray-plane intersection.

16. The computer program product of claim 15, further causing the computer to:
receive images of a user;
identify a position of the user's hand;
determine a direction of motion of the hand; and
provide a new image to a display based on the direction of motion.

17. The computer program product of claim 13, further causing the computer to store a ray equation for each camera pixel and a phase plane equation in a lookup table.

18. The computer program product of claim 13, further causing the computer to determine a position of the camera pixel in the three-dimensional space based on the ray-plane intersection.

* * * * *